United States Patent [19]

Hipp et al.

[11] 4,398,749
[45] Aug. 16, 1983

[54] DEVICE FOR ADJUSTABLY FASTENING A BELT FITTING TO AN AUTOMOBILE BODY

[75] Inventors: Karl H. Hipp, Munich; Josef Märtz, Eching, both of Fed. Rep. of Germany

[73] Assignee: Bayerische Motoren Werke Aktiengesellschaft, Munich, Fed. Rep. of Germany

[21] Appl. No.: 239,513

[22] Filed: Mar. 2, 1981

[30] Foreign Application Priority Data

Mar. 1, 1980 [DE] Fed. Rep. of Germany ....... 3007986

[51] Int. Cl.³ .............................................. B60R 21/10
[52] U.S. Cl. .................................... 280/801; 280/808; 297/483
[58] Field of Search ........................ 280/801, 802, 808; 297/410, 483

[56] References Cited

U.S. PATENT DOCUMENTS 3,964,798 6/1976 Burleigh .............................. 280/808
4,159,848 7/1979 Manz .................................... 297/483
4,225,185 9/1980 Krzok ................................... 280/801
4,311,323 1/1982 Provensal ............................ 280/801

FOREIGN PATENT DOCUMENTS 1964123 7/1971 Fed. Rep. of Germany .
2039103 2/1972 Fed. Rep. of Germany ...... 280/801
2460092 6/1976 Fed. Rep. of Germany ...... 280/808
1367248 9/1974 United Kingdom .
1486974 9/1977 United Kingdom .

Primary Examiner—Joseph F. Peters, Jr.
Assistant Examiner—John A. Carroll
Attorney, Agent, or Firm—Craig and Burns

[57] ABSTRACT

A device for adjustably fastening a fitting to an automobile body for a belt of a safety belt system for motor vehicle passengers is disclosed. The device has a fitting that can be slidably adjusted manually, with an adjusting component that carries the fitting and is located in a guide that is attached to the automobile body. The adjusting component in belt stressing direction is locked with a locking mechanism that engages automatically and has locking surfaces that are located essentially vertically to the sliding direction. A mechanism is also provided in the device for the automatic release of the locking effect when the adjusting component is adjusted in the direction opposite the belt stressing direction whereby the belt fitting can be adjusted simply and comfortably.

15 Claims, 2 Drawing Figures

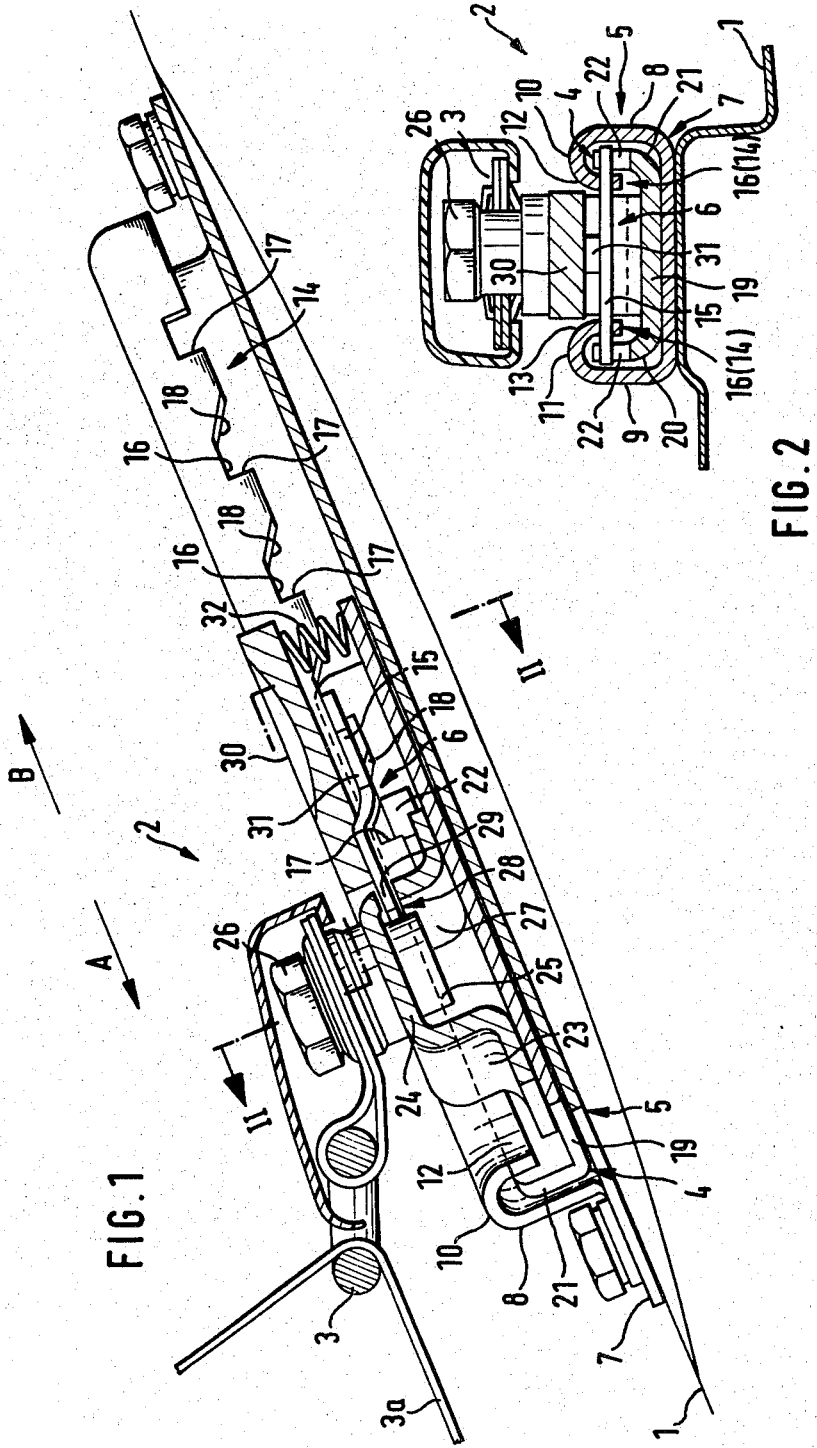

DEVICE FOR ADJUSTABLY FASTENING A BELT FITTING TO AN AUTOMOBILE BODY

BACKGROUND AND SUMMARY OF THE INVENTION

The present invention concerns a device for adjustably fastening a belt fitting to an automobile body for a belt of a safety belt system for motor vehicle passengers wherein the device comprises a fitting that can be slidably adjusted manually, with an adjustment component that carries the fitting and is located in a guide that is attached to the automobile body, and wherein the adjusting component in belt stressing direction is locked by means of a locking mechanism that engages automatically by means of a spring and has locking surfaces that are located essentially vertically to the sliding direction. A device of this type is known from DE-OS No. 19 64 123. In the case of this known device, the belt fitting must be pressed down manually and during the adjustment, must be held in the pressed-down position in order to release the lock so that the belt fitting can be adjusted in any of the adjustment directions. The handling of this device is not particularly comfortable. When the fitting is adjusted frequently, the handling of the device can be strenuous and can therefore seem annoying.

The handling is especially strenuous when such a device is used for adjusting the height of a belt fitting that is adjacent to the passenger's shoulder for the purpose of deflecting the belt strap.

An object of the present invention is to provide an improved device of the aforementioned type such that its handling is simple and comfortable.

This object is attained according to the present invention by providing in a device of the aforementioned type means for the automatic release of the locking effect when the adjusting component of the device is adjusted in the direction opposite the belt stressing direction.

It is an advantage of the present invention that, when the belt fitting is adjusted in the direction that is opposite to the belt stressing direction and thus opposite to the actual locking direction, the belt fitting can be slid manually without further additional handling.

In the case of a device that is used for adjusting the height of the belt deflection fitting that is adjacent to the shoulder, this considerably facilitates the finding of the height adjustment of the fitting suitable for the respective passenger.

Another advantage is that the present invention is not limited to devices with translationally adjustable components that carry the belt fitting. Thus, a device according to the present invention may have, for example, an adjusting component that is rotatably adjusted for an optimization of the course of the belt strap with respect to the passenger.

The handling of the device according to the present invention is further improved, according to another feature of the present invention in that a push-button is located at the device for releasing the locking effect in belt stressing direction.

The means for the automatic release of the locking effect when the adjusting component is adjusted in the direction opposite the belt stressing direction and a provision of a push-button located at the device for releasing the locking effect in belt stressing direction insure that, in the case of an automatic belt, there is the advantage that the belt fitting of a belt that is already used by the passenger can be adjusted simply and comfortably for an optimization of the course of the belt strap.

According to a further feature of the present invention the locking mechanism of the device has a lock that automatically engages in locking points provided at the device, and the means for the automatic release of the locking effect includes at least one of the lock and the locking points having on the side toward the direction opposite the belt stressing direction a sloped surface that forces the lock out of the respective locking points when the adjusting component is adjusted in the direction opposite the belt stressing direction.

According to a disclosed, preferred embodiment of the present invention the device comprises a guide which has two toothed strips that are arranged at a parallel distance, the toothed gaps of the strips providing the locking points within which a lock engages. The lock is elastically supported at the adjusting component and located transversely to the two strips. The toothing of the two strips in this embodiment has a saw-toothed profile.

Compared to the toothed strip with teeth surfaces that are diagonal on both sides as shown in FIG. 7 of the aforementioned DE-OS No. 19 64 123, the saw-toothed profile of the present invention has the advantage that the locking surfaces of the toothed strips are directed vertically to the adjusting direction of the adjusting component that carries the fitting and thus an accidental unlocking of the belt fitting in the case of jolting stress is avoided.

An additional feature of the disclosed, preferred embodiment of the present invention is that the guide is a rail that is essentially U-shaped in its cross section, with approximately C-shaped inwardly directed end areas of the legs, with the two toothed strips being formed by the free end sections of the respective C-profiles. The cooperating adjusting component has a sliding head that is U-shaped in its profile, which, with the free ends of its legs engages in the C-profiles of the guide and also, in both legs, has guide slits for the lock which are in alignment with tooth gaps or locking points of the strips that are opposite each other. This arrangement of the present invention is advantageous in that it permits the manufacture of essential parts of the device as pressed sheet-metal pieces which can be produced with relatively simple working steps in a cost-effective manner. Also, by means of the C-profile s at the sides of the guide, a high stability can be achieved with a minimum thickness of sheet-metal thereby lowering the resultant weight of the device.

Another important feature of the present invention is that the sliding head of the adjusting component carries a support that is approximately hat-shaped in its cross section with a welding nut being located at the bar of the support for a holding-down bolt of the belt fitting. The support also has a perforation located at one of the legs thereof for the swivel-engagement of a push-button. The push-button is a plastic push-button and includes an approximately T-shaped metal element with extensions that project over the push-button, one of the extensions extending as a tongue to engage in a swiveling manner the perforation at the support and the other extensions forming the lock. In this manner a simple mounting of the adjusting component in the guide as well as of the belt fitting and the push-button at the support of the adjusting component is achieved.

By providing guide slits in the legs of the sliding head for the lock, the push-button that is firmly connected with the lock, is secured in its position without additional measures at the adjusting component. This also makes it possible that the push-button, in a constructively simple manner, can be mounted with one end at the support of the sliding head so that it can be swiveled, and at the other end can be supported by an elastic device. Thus an automatically acting locking mechanism is obtained at little expense which, with a corresponding coordination of the lever arms of the lock and of the elastic device with respect to the swivel bearing point, is of easy motion and therefore easy to operate.

These and other objects, features and advantages of the present invention will become more apparent from the following description when taken in connection with the accompanying drawings which show, for purposes of illustration only, one embodiment in accordance with the present invention.

BRIEF DESCRIPTION OF THE DRAWINGS

FIG. 1 shows a device according to the present invention in perspective view in longitudinal section; and FIG. 2 shows a section taken along line II—II in FIG. 1 in the area of the anchoring of the fitting at the adjusting component.

DETAILED DESCRIPTION OF THE DRAWINGS

FIG. 1 shows a device 2 for the adjustment of the height of a deflection fitting 3 located in the shoulder area of a passenger for an automatic seat belt 3a, the device 2 being attached to the B-column of a passenger car (not shown). The device 2 has an adjusting component 4 that carries the deflection fitting 3. The adjusting component is located, in a slidable manner, in a guide 5 connected with the automobile body and is locked by means of an automatically acting locking mechanism 6 at the respective height. The guide 5 is a rail 7 that is essentially U-shaped in its cross-section. The legs 8 and 9 of the U-shaped rail are configured in the free end areas thereof, in an approximately C-shaped manner, directed inward. With their free end sections, the C-profiles 10 and 11 form strips 12 and 13 that extend at a parallel distance from each other and each have a toothing 14.

The gaps between the teeth of the toothed strips 12 and 13 form the locking points 16 at the device 2 for a lock 15 of the locking mechanism 6. Each locking point 16, on the one hand, has a locking surface 17 that is directed essentially vertically to the sliding direction of the adjusting component 4, and on the other hand, a deflector slope 18. Thus the stopping points 16 at each strip 12, 13 in each case result in a toothing 14 with a saw-toothed profile.

The adjusting component 4 has a sliding head 19 that is U-shaped in its cross-section and, with the free ends of its sides 20, 21 engages in the C-profiles 10 and 11 of the guide 5. Guide slits 22 that are in alignment with locking points 16 or tooth gaps of the strips 12, 13, are located in the two legs 20 and 21 for the reception of the lock 15 with a rectangular profile that is in transverse direction to the toothed strips 12, 13.

The sliding head 19 carries a support 23 that is approximately hat-shaped in its profile with a welding nut 25 for the holding-down bolt 26 of the belt fitting 3 being located at the bar 24. At its leg 27, the support 23 has a perforation 28 for the engagement of a tongue 29, that can be swivelled, at a push-button 30 which is used for the release of the locking effect through the lock 15 in belt stressing direction according to Arrow A.

The tongue 29 is formed by an extension projecting over the push-button 30 of a metal element 31 that is T-shaped and firmly connected with the push-button 30. The extensions of this metal element 31 that project laterally over the push-button 30 form the lock 15. For the adjustment of the belt fitting 3 in belt stressing direction according to Arrow A, the lock 15 is, by the pressing-down of the push-button 30 against the effect of the pressure spring 32, disengaged from the locking surfaces 17 of the respective locking points 16 or tooth gaps. In the opposite direction according to Arrow B, the belt fitting 3 can be slid without an activation of the push-button 30 because the deflector slopes 18 of the respective locking points 16 or tooth gaps force the lock 15 out of the locking points 16 or tooth gaps against the effect of a pressure spring 32. When the next locking point 16 is reached, the lock 15 engages automatically, in which case the process can be repeated until the desired height adjustment of the belt fitting 3 is obtained.

By means of the device 2, it is achieved that when the belt fitting 3 that is attached to the body of the vehicle is adjusted in the opposite direction according to Arrow B, the locking effect of the locking mechanism 6 is released automatically.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A mechanism for adjusting a fitting for the belt of a motor vehicle seat belt system with said fitting being fastened to the motor vehicle body, the fitting being vertically adjusted manually, comprising a guide, fastened to the vehicle body, for an adjusting member with an anchorage means for the fitting and a pressure-activated lock bolt which, by means of spring tension, engages automatically into tooth gaps, serving as stop points, of a locking tooth construction disposed at the guide, with said locking tooth construction having locking surfaces aligned substantially vertically to the sliding direction of the adjusting member in belt stress direction, characterized in that the lock bolt is disposed separately and movably at the anchorage means of the fitting, that the locking tooth construction has deflector slopes by means of which the lock bolt is automatically removed from the respective stop point when the adjusting member is adjusted in the opposite direction, and that a push-button is provided for operating the lock bolt.

2. A device according to claim 1, wherein said guide has two toothed strips that are arranged at a parallel distance, the toothed gaps of said strips providing said locking points within which said lock bolt engages, said lock bolt being elastically supported at said adjusting component and located transversely to the two strips, and wherein the toothing of the two strips has a saw-toothed profile.

3. A device according to claim 2, wherein said guide is a rail that is essentially U-shaped in its cross-section, with approximately C-shaped inwardly directed end areas of the legs, said two toothed strips being formed by the free end sections of the respective C-profiles.

4. A device according to claim 3, characterized in that said adjusting member has a sliding head that is U-shaped in its profile, which, with the free ends of its legs engages in the C-profiles of the guide and also, in both legs, has guide slits for the lock bolt which are in alignment with tooth gaps or locking points of the strips that are opposite each other.

5. A device according to claim 4, characterized in that the sliding head carries a support that is approximately hat-shaped in its cross-section with a welding nut being located at the bar of the support for a holding-down bolt of the belt fitting, said support also having a perforation located at one of the legs thereof for the swivel-engagement of said push-button.

6. A device according to claim 5, characterized in that said push-button is a plastic push-button and includes an approximately T-shaped metal element with extensions that project over the push-button, one of the extensions extending as a tongue to engage in a swiveling manner the perforation at the support and the other extensions forming the lock.

7. A device according to claim 1, characterized in that said adjusting member has a sliding head which carries a support that is approximately hat-shaped in its cross-section with a welding nut being located at the bar of the support for a holding-down bolt of the belt fitting, said support also having a perforation located at one of the legs thereof for the swivel-engagement of said push-button.

8. A device for adjustably fastening a fitting to an automobile body for a belt of a safety belt system for motor vehicle passengers, said device comprising a fitting that can be slidably adjusted manually, with an adjusting component that carries the fitting and is located in a guide that is attached to the automobile body, wherein the adjusting component in belt stressing direction is locked by means of a locking mechanism that engages automatically by means of a spring and has locking surfaces that are located essentially vertically to the sliding direction, characterized in that means are provided for the automatic release of the locking effect when the adjusting component is adjusted in the direction opposite the belt stressing direction,
 a push-button located at the device for releasing the locking effect in belt stressing direction,
 wherein said locking mechanism has a lock that automatically engages in locking points provided at the device, and wherein said means for the automatic release of the locking effect includes at least one of the lock and the locking points having on the side toward the direction opposite the belt stressing direction a sloped surface that forces the lock out of the respective locking point when the adjusting component is adjusted in the adjusting direction opposite the belt stressing direction,
 wherein said guide has two toothed strips that are arranged at a parallel distance, the toothed gaps of said strips providing said locking points within which said lock engages, said lock being elastically supported at said adjusting component and located transversely to the two strips, and wherein the toothing of the two strips has a saw-toothed profile, and
 wherein said guide is a rail that is essentially U-shaped in its cross-section, with approximately C-shaped inwardly directed end areas of the legs, said two toothed strips being formed by the free end sections of the respective C-profiles.

9. A device according to claim 8, characterized in that said adjusting component has a sliding head that is U-shaped in its profile, which, with the free ends of its legs engages in the C-profiles of the guide and also, in both legs, has guide slits for the locks which are in alignment with tooth gaps or locking points of the strips that are opposite each other.

10. A device according to claim 9, characterized in that the sliding head carries a support that is approximately hat-shaped in its cross-section with a welding nut being located at the bar of the support for a holding-down bolt of the belt fitting, said support also having a perforation located at one of the legs thereof for the swivel-engagement of said push-button.

11. A device according to claim 10, characterized in that said push-button is a plastic push-button and includes an approximately T-shaped metal element with extensions that project over the push-button, one of the extensions extending as a tongue to engage in a swiveling manner the perforation at the support and the other extensions forming the lock.

12. A device for adjustably fastening a fitting to an automobile body for a belt of a safety belt system for motor vehicle passengers, said device comprising a fitting that can be slidably adjusted manually, with an adjusting component that carries the fitting and is located in a guide that is attached to the automobile body, wherein the adjusting component in belt stressing direction is locked by means of a locking mechanism that engages automatically by means of a spring and has locking surfaces that are located essentially vertically to the sliding direction, means for automatically releasing of the locking effect when the adjusting component is adjusted in the direction opposite the belt stressing direction,
 a push-button located at the device for releasing the locking effect in belt stressing direction, and
 characterized in that said adjusting component has a sliding head which carries a support that is approximately hat-shaped in its cross-section with a welding nut being located at the bar of the support for a holding-down bolt of the belt fitting, said support also having a perforation located at one of the legs thereof for the swivel-engagement of said push-button.

13. A device according to claim 12, characterized in that said push-button is a plastic push-button and includes an approximately T-shaped metal element with extensions that project over the push-button, one of the extensions extending as a tongue to engage in a swiveling manner the perforation at the support and the other extensions forming the lock.

14. A device for adjustably fastening a fitting to an automobile body for a belt of a safety belt system for motor vehicle passengers, said device comprising a fitting that can be slidably adjusted manually, with an adjusting component that carries the fitting and is located in a guide that is attached to the automobile body, wherein the adjusting component in belt stressing direction is locked by means of a locking mechanism that engages automatically by means of a spring and has locking surfaces that are located essentially vertically to the sliding direction, characterized in that means are provided for the automatic release of the locking effect when the adjusting component is adjusted in the direction opposite the belt stressing direction, wherein said locking mechanism has a lock that automatically engages in locking points provided at the device and wherein said means for the automatic release of the locking effect includes at least one of the lock and the locking points having on the side toward the direction opposite the belt stressing direction a sloped surface that forces the lock out of the respective locking point when the adjusting component is adjusted in the direction opposite the belt stressing direction, wherein said guide has two toothed strips that are arranged at a parallel distance, the tooth gaps of said strips providing said locking points within which said lock engages, said lock being elastically supported at said adjusting component and located transversely to the two strips, and wherein the toothing of the two strips has a saw-toothed profile, and wherein said guide is a rail that is essentially U-shaped in its cross-section, with approximately C-shaped inwardly directed end areas of the legs, said two toothed strips being formed by the free end sections of the respective C-profiles.

15. A device according to claim 14, characterized in that said adjusting component has a sliding head that is U-shaped in its profile, which, with the free ends of its legs engages in the C-profiles of the guide and also, in both legs, has guide slits for the lock which are in alignment with tooth gaps or locking points of the strips that are opposite each other.

* * * * *